൧

3,597,253
PRODUCTION OF FINELY DIVIDED ORGAN-
ICALLY MODIFIED WATER INSOLUBLE
ALKALINE EARTH METAL AND EARTH
METAL SILICATES
Helmut Beschke, Frankfurt am Main, Hans Pfleger, Neu Isenburg, Wilhelm Berndt, Frankfurt am Main, Peter Nauroth, Wesseling Bezirk Cologne, Horst Ferch, Bruchkobel, and Edith Eisenmenger, Offenbach am Main, Germany, assignors to Deutsche Gold- und Silber-Scheideanstalt vormals Roessler, Frankfurt am Main, Germany
No Drawing. Filed Jan. 17, 1968, Ser. No. 698,410
Claims priority, application Germany, Jan. 17, 1967,
D 52,029
Int. Cl. C09c 3/00
U.S. Cl. 106—288B      5 Claims

ABSTRACT OF THE DISCLOSURE

Production of organically modified finely divided alkaline earth metal and earth metal silicates and silicas by wet precipitation of such silicates and silicas from alkali metal silicate solutions with aqueous solutions of alkaline earth metal or earth metal salts or acids, preferably at temperatures between about 10 and 90° C. in the presence of water soluble reactive organic polymeric materials, for instance, polymers containing the reactive amino, hydroxyl, carboxyl, amide or keto groups. The thus obtained modified silicates and silicas can be further modified by effecting reactions with the reactive groups of the bound polymers in the silicates and silicas.

RELATED APPLICATION

This application is related to application Ser. No. 646,452, filed June 16, 1967 and now abandoned.

BACKGROUND OF THE INVENTION

The invention relates to a process for the production of organically modified finely divided silicate or silica products by precipitation from silicate solutions whch leads to products which are susceptible to a number of organic reactions.

It is known that silica can be precipitated with acids in the presence of suspensions of water insoluble organic polymers, such as, for example, rubber latices, from water glass solutions, whereby so-called co-precipitates are obtained in which the individual components are so intimately mixed with each other that they are easily incorporated into, for example, a rubber sheet. However, the organic compound can be removed again with the aid of solvents.

It furthermore is known that finely divided silicas or silicates can be provided with hydrophobic or hydrophilic surface properties by treatment with liquid or vaporized low molecular organic compounds such as organic silicon compounds or other hydrophobizing or hydrophilizing compounds which coat the surfaces of such silicas and silicates. The organic groups of such treating compounds which are adsorptively bound on the surfaces of such treated silicas and silicates in general are not available for further reactions.

SUMMARY OF THE INVENTION

It is the object of the invention to provide a process for the production of organically modified finely divided alkaline earth metal and earth metal silicates and silicas by precipitation from silicate solutions with aqueous solutions of alkaline earth metal salts or earth metal salts or acids which leads to products in which the organic components cannot be washed out with water or organic solvents and which are susceptible to a large number of organic reactions and which provide products of valuable characteristics which can be used as fillers.

The essence of the invention resides in that the precipitation of the alkaline earth metal silicate or earth metal silicate or silica from silicate solutions with the aid of aqueous solutions of appropriate alkaline earth metal or earth metal salts or with inorganic acids is carried out in the presence of reactive water soluble organic polymers. Such precipitation, for example, can be carried out at temperatures between 10 and 90° C. and in the case of the precipitation of silica it is preferably carried out at elevated temperatures of, for example, 50–90° C. In the production of the modified silicates the precipitation can be carried out in the acid as well as in the alkaline range. Either alkaline or acid conditions can be maintained during the reaction. Suitable water soluble organic polymeric materials, for example, are: polyvinyl alcohol, polyethylene imine, polyacrolein, polymethacrylic acid, polyethylene oxide, anionic or cationic starch, polyvinyl pyrrolidone, polyvinyl - 3 - methyl-pyrrolidone, vinyl - pyrrolidone - vinyl-acetate copolymers, polyacrylamide and other water soluble polymers, polycondensates and polyaddition products, as well as their homologues and water soluble reaction products.

DETAILED DESCRIPTION OF THE INVENTION
INCLUDING PREFERRED EMBODIMENTS

The water soluble silicate used as the starting aqueous silicate solution from which the modified silicates or silicas according to the invention are precipitated, for example, preferably is water glass but it is also possible to use potassium silicates or colloidally dissolved silicic acid. The usual acids, such as, for example, sulfuric acid, can be used for the precipitation of the silica. The salts which, for example, can be employed in the precipitation of the alkaline earth metal or earth metal silicates, for example, can be magnesium sulfate, calcium chloride, barium chloride, aluminum sulfate and the like.

The process according to the invention can, for instance, be carried out by dissolving the water-soluble organic polymeric material in the solution in which the precipitation is to be effected before initiation of the precipitation. In general, a uniform incorporaton of the organic polymer in the precipitating silicate or silica is effected. However, advantageously an aqueous solution of the organic polymer can be added gradually during the precipitation to ensure such uniform incorporation. The latter may be expedient in such instances when upon nucleus formation of the silicate or silica particles such large quantities of the organic material are already bound that the organic material content of the aqueous solution is prematurely exhausted, so that in the further growth of the modified silicate or silica particles, a practically pure silicate or silica shell is formed around the organically modified nucleus which is first formed. This, for instance, is the case in the embodiment of the invention when polyethylene imine is employed as the water soluble modifying agent. It also is possible to direct the process in such a way that the resulting particles consist of a pure silica nucleus and an organically modified shell, for instance, by appropriate delay in addition of the organic modifying agent.

The process according to the invention can be carried out in conventional apparatus used for silica precipitation and requires no additional apparatus, solvents or process steps.

The modified silicate or silica products produced according to the invention are marked by the manner in which the organic polymers are firmly held in the silicate or silica particles. Thus the organic component of the modified silica products according to the invention cannot be washed out with water, acids or organic solvents. The reactive groups of the organic polymers, for instance, amino, hydroxyl, carboxyl, amide or keto groups, remain completely reactive. As a consequence a number of reactions can be carried out at the surface of the modified silicate or silica products, such as, for example, substitutions, additions, salt formation which leads to other modified silicate or silica products. A substantial advantage of the process according to the invention resides in that they are susceptible to a large number of organic reactions. These reactions, depending upon the susceptibility of the reactive groups of the polymers employed cannot only be carried out after recovery of the precipitated modified silicate or silica product but rather can also be carried out in the precipitated suspension either during or after the precipitation. It is, of course, also possible to react the organic polymer with the further modifying agent before coprecipitation with the silicate or silica is initiated.

The modified silicate or silica products obtained according to the invention can be used as such or as intermediates in the fields of pigments, basic or acidic ion exchange agents, lacquer adjuvants, for instance, as delustering agents, free running adjuvants, fillers for polymers, for instance, silicone rubber with improved soft rolling properties and in reproduction papers. In addition, the products according to the invention can be further improved for a number of fields of use by reactive, substantive or leuco coloration. The reactive groups which are built into the pigments also enable cross-linkages with polyvalent reagents.

The organically modified silicate or silica products according to the invention are especially interesting for use in paper manufacture. Previously known paper fillers, such as, for example, natural earths or untreated precipitated silicates, are inert with respect to dyes. On the other hand, cellulose itself can be dyed with most dyestuffs. As the filler distribution in the paper sheet is non-uniform because of the procedure used in its production, this leads to a decided "two-sidedness," that is, the filler poor "sieve" side of the paper is dyed more intensively than the filler rich "felt" side. This phenomena also occurs with the optic brightners which are widely used today and therefore it presents a real problem. This two-sidedness can be avoided by the use of a filler which binds the dye to the same degree as cellulose and the fillers according to the invention can be suited products therefor. The problem of pigment dyeing also occurs in the surface coating of paper. In this instance, the modified silicate or silica pigments according to the invention also provide a way to bind the dye firmly in the coating.

A known disadvantage of paper fillers is that they disturb the strength characteristics of paper. Pigments according to the invention carry reactive groups which are available for a cross-linking. Therefore, by treatment with suitable polyvalent reagents, firm bonds can be produced between the filler and the fiber and thereby significant improvements in the strength of the paper can be achieved.

A further improvement can also be attained when polymers are built into the silicate and silica products according to the invention which alter the state of change of the silicate or silica (pigment) particles. The pigment then exhibits substantially improved retention and also is in the position to improve the retention of other pigments used simultaneously therewith.

The following examples will serve to illustrate the process according to the invention.

Example 1

(a) 20 g. of polyvinyl alcohol (Moviol N 70–88) were dissolved in 1 liter of water and 65 ml. of water glass containing 25.8 wt. percent of $SiO_2$ and 7.7 wt. percent of $Na_2O$ added thereto. The solution was heated to 82° C. and a further 231 ml. of water glass and 30 ml. of concentrated $H_2SO_4$ added thereto very gradually. The addition of the water glass was over a period of 90 minutes and the addition of the $H_2SO_4$ was over a period of 130 minutes. At the end of the reaction the pH of the suspension was 2.5. One liter of water was added thereto and the precipitated product filtered off and carefully washed with water. The filter cake was dried for 24 hours at 70° C.

111 g. of a finely divided silica product of the following analysis were obtained: C=2.39 wt. percent, H=1.51 wt. percent, residue after calcining 86.08 wt. percent BET surface area 461 m.$^2$/g., primary particle size about 10–80 m$\mu$, particles having porous surface (electron microscopic investigation).

Products with lower or higher C and H content can be obtained by varying the concentration of the polymer.

(b) In an analogous test using only 5 g. of polyvinyl alcohol (Moviol N 70–88), a product containing 1.33 wt. percent of carbon and 1.12 wt. percent of hydrogen was obtained.

(c) When the precipitation was carried out in the presence of 50 g. of the polyvinyl alcohol, the product contained 6.31 wt. percent of carbon and 1.12 wt. percent of hydrogen.

The products obtained are suitable for dyeing with reactive dyes as in Example 9; they can be used also as ingredients in lacquers, for instance, as colored delustering media in transparent lacquers.

Example 2

(a) The procedure of Example 1 was repeated except that the polyvinyl alcohol was replaced by 10 g. of a normal commercial 50% aqueous solution of polyethylene imine with an N content of about 16% (Polymin P produced by catalytic acid (cationic) polymerization of ethylene imine which is terminated by neutralization before water insolubility is reached). 114 g. of a finely divided silica product of the following analysis were obtained: C=2.35 wt. percent, H=1.29 wt. percent, N=1.53 wt. percent, residue on calcination 85.36 wt. percent, BET surface area 305 m.$^2$/g., primary particle size 5–60 m$\mu$, particles finely porous.

(b) 180 g. of the 50% aqueous polyethylene imine solution were dissolved in 7 liters of water and 467 ml. of water glass added thereto and the solution heated to 86° C. Then at this temperature a further 1370 ml. of water glass and 195 ml. of concentrated $H_2SO_4$ were added very gradually in such a way that the addition of the former was completed in 90 minutes and the latter in 120 minutes. When the addition of the sulfuric acid was completed the pH of the suspension was 2.5. The suspension was diluted with 5 liters of water and filtered. The filter cake was carefully washed out with water and dried at 70° C. for 24 hours.

840 g. of a finely divided silica product of the following analysis were obtained: C=5.46 wt. percent, H=2.18 wt. percent, N=3.57 wt. percent residue on calcination 77.48 wt. percent.

(c) A precipitation carried out as described above using 488 g. of 50% polyethylene imine gave 1010 g. of a finely divided silica product of the following analysis: C=10.60 wt. percent, H=3.40 wt. percent, N=6.24 wt. percent residue on calcination 61.92 wt. percent.

The products obtained are suitable as thickening agents in aqueous systems.

Example 3

When a precipitation was carried out analogously to that of Example 1a but using an aqueous solution of polyacrolein in which 17 g. of polyacrolein were dissolved with sodium bisulfite in 100 ml. of water instead of the polyvinyl alcohol, 103 g. of a finely divided silica product of the following analysis were obtained: C=3.29 wt. percent, H=1.44 wt. percent, residue on calcination 89.36 wt. percent, BET surface area 288 m.$^2$/g., primary particle size 5–30 m$\mu$.

Example 4

When a precipitation was carried out as in Example 1a but using 60 ml. of a 5 wt. percent aqueous solution of sodium polymethacrylate instead of the polyvinyl alcohol, 99 g. of a finely divided silica product of the following analysis were obtained: C=1.84 wt. percent, H=1.16 wt. percent, residue on calcination 89.45 wt. percent, BET surface area 475 m.$^2$/g., primary particle size 5–50 m$\mu$.

Example 5

50 g. of polyvinyl pyrrolidone (Kollidon K 25 mol. wt. 25,000) were dissolved in 10 liters of water and 700 ml. of water glass added thereto. After heating to 85° C. a further 2050 ml. of water glass and 200 ml. of concentrated H$_2$SO$_4$ added gradually over a period of 90 minutes. Thereafter further H$_2$SO$_4$ was added gradually until a pH of 2.7 was reached. The precipitate was filtered off and carefully washed with distilled water and dried at 80° C. 1086 g. of a finely divided silica product of the following analysis were obtained: C=2.82 wt. percent, H=1.13 wt. percent, N=0.85 wt. percent, residue on calcination 84.32 wt. percent, BET surface area 170 m.$^2$/g.

(b) Analogously when using 50 g. of polyvinyl pyrrolidone of a molecular weight of about 38,000 (Luviskol K 30) 1056 g. of a finely divided silica product of the following analysis were obtained: C=2.76 wt. percent, H=1.24 wt. percent, N=0.83 wt. percent, residue on calcination 86.1 wt. percent, BET surface area 166 m.$^2$/g.

(c) Analogously when using 100 g. of polyvinyl pyrrolidone of a molecular weight of about 75,000 (Luviskol K 90) 1103 g. of a finely divided silica product of the following analysis were obtained: C=6.66 wt. percent, H=0.99 wt. percent, N=1.46 wt. percent, residue on calcination 84.48 wt. percent, BET surface area 115 m.$^2$/g.

(d) Analogously when using 50 g. of polyvinyl-3-methyl pyrrolidone-(2), 1066 g. of finely divided silica of the following analysis were obtained: C=3.60 wt. percent, H=1.55 wt. percent, N=0.70 wt. percent, residue on calcination 89.56 wt. percent, BET surface area 262 m.$^2$/g.

(e) 40 g. of polyvinyl pyrrolidone (Luviskol K 90) were dissolved in 12 liters of water. Then 1075 ml. of water glass and 102 ml. of concentrated H$_2$SO$_4$ were added gradually to such solution at 50° C. over a period of 30 minutes in such a way that the pH of the solution was maintained between 5 and 6. The resulting precipitate was filtered off, thoroughly washed and dried at 80° C. 426 g. of finely divided silica of the following analysis were obtained: C=6.34 wt. percent, H=1.44 wt. percent, N=1.38 wt. percent, residue on calcination 82.08 wt. percent, BET surface area 526 m.$^2$/g.

These products after grinding and cyclone classification are suited as matting agents which do not separate. They also can be substantively dyed as in Example 8 and used as pigments.

Example 6

When precipitation was carried out analogously as in Example 5a using 50 g. of polyethylene glycol of an average molecular weight of 15,000 instead of the polyvinyl pyrrolidone and a precipitation temperature of 75° C., 1040 g. of a silica product of the following analysis were obtained: C=3.54 wt. percent, H=0.89 wt. percent, residue on calcination 89.94 wt. percent, BET surface area 342 m.$^2$/g.

(b) 25 g. of polyethylene glycol 15,000 and 15 ml. of concentrated H$_2$SO$_4$ were dissolved in 10 liters of water and after heating to 80° C. gradually adding 120 ml. of concentrated H$_2$SO$_4$ and 1375 ml. of water glass in 110 minutes in such a way that the starting pH of 1.4 gradually rose to 2.6. 489 g. of silica of the following analysis were obtained: C=2.48 wt. percent, H=1.14 wt. percent, residue on calcination 90.99 wt. percent, BET surface area 512 m.$^2$/g.

The products obtained are suitable as thickening agents in aqueous systems.

Example 7

(a) 700 ml. of water glass were dissolved in 10 liters of water and 2050 ml. of water glass and 200 ml. of concentrated H$_2$SO$_4$ added gradually at 85° C. over a period of 95 minutes. After 70 minutes and continuing to the end of the 95 minute period, 90 g. of polyethylene imine in 500 ml. of water were also added gradually. Thereupon the reaction mixture was acidified to a pH of 2.6 with about 70 ml. of concentrated H$_2$SO$_4$. The precipitate was filtered off, thoroughly washed and dried at 80° C. 1062 g. of silica of the following analysis were obtained: C=2.51 wt. percent, H=1.36 wt. percent, N=1.49 wt. percent BET surface area 235 m.$^2$/g.

(b) The procedure under (a) was repeated to the acidification to a pH of 2.6. Then the reaction mixture was neutralized with sodium bicarbonate to a pH of 6.5 and then 40 g. of the reactive dye Procion-Brilliant-Red M–8 BS (ICI) quickly added thereto at 80° C. while stirring intensively. The stirring was continued for 30 minutes after such addition and the precipitate thereupon filtered off and thoroughly washed. After drying at 80° C., 1090 g. of an intensive red dyed silica were obtained. The dye was bound reactively and could not be removed by several hours' boiling in water.

(c) The procedure under (b) was repeated using the reactive dye Drimaren-gold yellow-Z-R (Sandoz). 1087 g. of a gold yellow dyed silica were obtained in which the dye was bound reactively.

Similar reactive dyes were also obtained with Remazol brilliant violet 5 R (Hoechst) and Solidazol-brilliant rubin RR (Casella).

(d) The procedure under (a) was repeated to the acidification to a pH of 2.6. Then the reaction mixture was neutralized to a pH of 6.0 with sodium bicarbonate and then 100 g. of crystallized copper sulfate dissolved in water added thereto. A stable copper complex formed on the surface of the precipitated silica. After filtering, thoroughly washing and drying, 1135 g. of a light blue colored silica of the following analysis were obtained: C=2.37 wt. percent, H=1.37 wt. percent, N=1.50 wt. percent, Cu=1.78 wt. percent. The bound copper could not be removed with water, aqueous ammonia or organic acid and could only be removed with strong mineral acids, such as, HCl.

(e) The procedure of (b) was repeated to the neutralization to a pH of 6.5 and then 40 g. of the acid dye Alizarin pure blue B added thereto. After filtering, washing and drying, 1082 g. of a blue dyed silica were obtained in which the dye was bound in the modified silica as a salt.

(f) The procedure of (d) was repeated to the neutralization to a pH of 6.0 and then 45 g. of 2,4-diamino-6-chloro-triazine added thereto at 80° C. while stirring. The stirring was continued for 1 hour and the precipitate then filtered off, washed and dried. A silica filler product was obtained in which the diamino triazine group was reactively bound on the surface. The analysis was as follows: C=3.40 wt. percent, H=1.40 wt. percent, N=2.22 wt. percent.

(g) The procedure of (d) was repeated to the neutralization to a pH of 6.0 and then 40 g. of powdered maleic acid anhydride added thereto at 85° C. After 30 minutes' stirring the precipitate was filtered off, washed and dried. 1068 g. of a finely divided modified silica were obtained in which maleic acid was bound at the surface as monoamide. The analysis was as follows: C=3.10 wt. percent, H=1.39 wt. percent, N=1.38 wt. percent, BET surface area 210 m.²/g.

(h) The procedure under (a) was repeated to the acidification to a pH of 2.6. Then the reaction mixture was neutralized to a pH of 6.2 and 100 g. of a 40 wt. percent Formalin solution added thereto. After 30 minutes 80 g. of urea and 20 g. of oxalic acid were added whereupon the pH dropped to 3.6. The mixture was then stirred for 3 hours at 60° C. and allowed to stand overnight. The precipitate was then filtered off, washed and dried. 1070 g. of a modified silica filler in which the urea is bound to the filler surface over methylene bridges were obtained. The analysis was as follows: C=3.63 wt. percent, H=1.46 wt. percent, N=3.10 wt. percent, BET surface area 215 m.²/g.

(i) The procedure under (a) was repeated to the acidification to a pH of 2.6 and then 200 g. of a polyacrolein-bisulfite solution (polyacrolein content 20 wt. percent) added thereto while stirring. After filtering, washing and drying, 1094 g. of a modified silica filler of the following analysis were obtained: C=4.62 wt. percent, H=1.70 wt. percent, N=1.76 wt. percent, BET surface area 130 m.²/g.

The products obtained are suitable as thickening agents in aqueous systems and as ion exchanger and as reactive ingredients in lacquers.

Example 8

(a) Precipitation with polyvinyl pyrrolidone (mol. wt. 25,000) was carried out as in Example 5a and after the precipitation ended, a solution of 10 g. of substantive dye Benzo pure blue S in 2 liters of water were added thereto. The mixture was stirred for a further 30 minutes at 85° C. and the precipitate filtered off, washed and dried. 1083 g. of an intensive blue dyed silica filler were obtained.

(b) Precipitation was carried out as under (a) and after precipitation ended a solution of 10 g. of the leuco vat dye ester Indigosol green IB (F) (powder) in 500 ml. water added thereto. The mixture was then held at 85° C. for a further 5 minutes and the precipitate then filtered off, washed and suspended in 10 liters of water in which 20 ml. of concentrated $H_2SO_4$ and 20 g. of sodium nitrite had been added.

The modified silica filler was dyed an intensive green. The oxidation of the dye ended in 30 minutes and the dyed filler then filtered off, washed and dried.

The products are suited as dyestuffs (pigments).

Example 9

Precipitation with polyvinyl alcohol was carried out as in Example 1 and after the precipitation ended 30 g. of the reactive dye Brilliant orange 2 RS (ICI) added thereto at 80° C. and the mixture stirred for a further 30 minutes. After filtering, washing and drying an intensively dyed silica filler was obtained.

The products are suited as dyestuffs (pigments).

Example 10

On working as stated in Example 5a, but using 5 g. of cationic starch instead of the polyvinyl pyrrolidone 1035 g. of finely divided silica of the following analysis were obtained: C=1.54 wt. percent, H=1.11 wt. percent, residue on calcination=90.80 wt. percent.

The modified silica obtained is very well suited as auxiliary agent in lacquering or textile finishing Example 11

30 g. of polyvinyl pyrrolidone K 90 were dissolved in 1½ liters of water and 54 g. of concentrated water glass. Then 2.75 liters of water glass of a density of 1.14 (prepared from 1.46 kg. of concentrated water glass and 1.67 liters of water) and 2.80 liters of an aluminum sulfate solution of a density of 1.051 were slowly dropped in simultaneously while stirring and maintaining a temperature of 60° C. The aluminum sulfate solution was preheated to 80° C. The addition of the water glass and aluminum sulfate solution was carried out over a period of 105 minutes until a pH of 8.3 reached in the precipitated suspension.

The suspended precipitate was filtered off and carefully washed. The filter cake was dried at 80° C. 588 g. of a modified aluminum silicate of the following analytic data were obtained:

C=3.79%
H=1.97%
N=0.50%
Calcination residue 80.94%
pH of a 4% aqueous suspension 9.3
Degree of whiteness (Elrepho Filter 6)
 $R\infty=98.2$
 $R_F=98.0$ Example 12

The procedure of Example 11 was repeated except that immediately after the precipitation was completed 1.5 g. of Blancophor R[1] were added to the precipitated suspension. Thereafter the mixture was stirred for an hour, filtered and the filtered precipitate washed and dried at 80° C.

590 g. of an optically brightened aluminum silicate of the following analytic data were obtained:

C=4.66%
H=1.88%
N=0.63%
Calcination residue 86.47%
pH of 4% aqueous suspension 9.3
Degree of whiteness (Elrepho Filter 6)
 $R\infty=99.0$
 $R_F=102.0$ Example 13

The procedure of Example 11 was repeated except that after the precipitate had been filtered off and washed the filter cake was stirred up in a ten-fold quantity of water and 1.5 g. of Blancophor R added thereto and the mixture stirred for one hour. Thereafter the precipitate was again filtered off, washed and then dried at 80° C.

575 g. of an optically brightened aluminum silicate of the following analytic data were obtained:

C=4.50%
H=2.12%
N=0.77%
Calcination residue 81.82%
Degree of whiteness (Elrepho Filter 6)
 $R\infty=99.2$
 $R_F=103.0$ When the previously dried and ground product of Example 1 was given the same brightening treatment the

---

[1] Blancophor R=

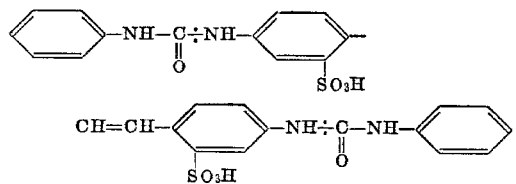

following degree of whiteness values (Elrepho Filter 6) were obtained:

$R_\infty = 99.0$
$R_F = 103.4$

Example 14

A solution of 84 ml. conc. HCl and 12 g. calcium chloride in 600 ml. of water was added to a solution of 465 g. of conc. water glass and 12 g. of polyvinyl pyrrolidone K 90 in 1 liter of water. The addition was at 70° C. while stirring over a period of 90 minutes and was ended when a pH of 8.1 was reached. After the precipitate was filtered off and dried at 80° C., 145 g. of a calcium silicate with about a 5% content of CaO were obtained.

The analytic data thereof was:

C=3.68%
H=1.47%
N=0.78%

Calcination residue 84.57%

A portion thereof was stirred up in a ten-fold quantity of water and treated for 1 hour with 0.3% of Blancophor R and then filtered off, washed and dried. The following degree of whiteness values (Elrepho Filter 6) were obtained:

Non-brightened: $R_\infty$, 97.4; $R_F$, 97.6
Brightened: $R_\infty$, 97.2; $R_F$, 101.0

Example 15

The procedure of Example 14 was repeated except that the calcium chloride in the HCl solution was replaced by 26.4 g. of barium chloride, whereby an organically modified barium silicate was obtained in a 160 g. yield. In this instance again a portion of the product was brightened with 0.3% of Blancophor R.

The following analytic data were obtained:

C=2.56%
H=1.38%
N=0.91%
Calcination residue 88.05%
Degree of whiteness (Elrepho Filter 6)
Non-brightened: R, 99.0; $F_F$, 99.0
Brightened: R, 100.0; $R_F$, 103.6.

Example 16

The procedure of Example 11 was repeated except that instead of 50 g. of polyvinyl pyrrolidone smaller quantities of polyvinyl pyrrolidone or various other polymeric materials (A) as indicated below were employed to obtain modified aluminum silicates (B) with the following analytic data:

(a)

A=50 g. of 50% polyethylene imine (as used in Example 2)
B=C=3.56%, H=2.24%, N=1.22%, calcination residue 82.11%

(b)

A=50 g. of cationic starch
B=C=4.80%, H=1.71%, calcination residue 75.35%

(c)

A=25 g. of polyvinyl pyrrolidone K 90
B=C=3.30%, H=2.04%, N=0.81%, calcination residue 82.89%

(d)

A=12.5 g. of polyvinyl pyrrolidone K 90
B=C=1.96%, H=1.91%, N=0.52%, calcination residue 84.80%

(e)

A=5 g. of polyvinyl pyrrolidone K 90
B=C=1.10%, H=1.80%, N=0.54%, calcination residue 86.27%

Example 17

A solution of 54 g. of conc. water glass in 1½ liters of water were prepared. The following solutions were then slowly dropped into such solution simultaneously at 60° C. while stirring over a period of 105 minutes: (1) 2.75 liters of water glass (produced from 1.46 kg. of conc. water glass and 1.67 liters of water); (2) 2.80 liters of aluminum sulfate solution of a density of 1.051 and (3) 50 g. of 50% polyethylene imine (as used in Example 2) in 500 ml. of water.

An aluminum silicate of the following analytic data was obtained:
C=3.65%
H=1.82%
N=1.28%
Calcination residue 82.11%

Example 18

The procedure of Example 14 was repeated except that otherpolymeric substances (A) were used instead of the 12 g. of polyvinyl pyrrolidone. Modified calcium silicates with the analytic data (B) were obtained:

(a)

A=24 g. 50% polyethylene imine
B=C=5.42%, H=2.33%, N=2.59% calcination residue 81.71%

(b)

A=12 g. of cationic starch
B=C=3.00%, H=1.57% calcination residue=86.03%

(c)

A=12 g. polyethylene glycol 15,000
B=C=1.47%, H=1.52% calcination residue 88.87%

(d)

A=12 g. of anionic starch
B=C=1.45%, H=1.22% calcination residue=89.87%

(e)

A=71 g. of 17% polyacrolein, as bisulfic compound
B=C=2.77%, H=1.33% calcination residue 86.03%

The products of Examples 11–18 are particularly suited as fillers for paper.

The minimum weight of the water soluble reactive organic polymer may be 3% as illustrated by Example 4 and the maximum weight can be 24% as illustrated by Example 2 (c).

We claim:

1. A process for the production of a finely divided organically modified silicate selected from the group consisting of alkaline earth metal silicates and earth metal silicates in which the silicate is precipitated from an aqueous alkali metal silicate solution by treatment with a precipitating agent selected from the group consisting of water soluble alkaline earth metal salts, water soluble earth metal salts and acids, the improvement which comprises carrying out such precipitation of the silicate in contact with a water soluble reactive organic polymer selected from the group consisting of polyvinyl alcohol, polyethylene imine, polyacrolein, polymethacrylic acid, polyethylene glycol, polyvinyl pyrrolidone, polyvinyl-3-methyl-pyrrolidone, vinyl pyrrolidone-vinyl acetate copolymers and polyacrylamide, the organic polymer being present in an amount from about 3 to about 24% by weight relative to the weight of the precipitated modified silicate.

2. A finely divided silicate wherein the molecule is organically modified throughout and which is produced by the process of claim 1.

3. The process of claim 1 in which the water soluble reactive organic polymeric materials is dissolved in the aqueous silicate solution before the precipitation of the silicate is ended.

4. The process of claim 3 in which the reactive water soluble organic polymeric material carries at least one reactive group selected from the group consisting of amino, amido, hydroxyl, carboxyl and keto groups.

5. The process of claim 3 in which the precipitation is carried out at a temperature of about 50 to 90° C.

References Cited

UNITED STATES PATENTS

| | | | |
|---|---|---|---|
| 2,780,611 | 2/1957 | Grotenhuis | 106—308N |
| 2,935,481 | 5/1960 | Hochwalt | 106—308O |

TOBIAS E. LEVOW, Primary Examiner

H. M. S. SNEED, Assistant Examiner

U.S. Cl. X.R.

8—8; 106—308O, 308N; 162—181C; 252—301.3W